(12) United States Patent
Hong et al.

(10) Patent No.: US 8,084,152 B2
(45) Date of Patent: Dec. 27, 2011

(54) LITHIUM ION SECONDARY BATTERY HAVING SHAPE MEMORY SAFETY VENT

(75) Inventors: Eui Sun Hong, Cheonan-si (KR); Yoon Tai Kwak, Cheonan-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1536 days.

(21) Appl. No.: 11/218,725

(22) Filed: Sep. 2, 2005

(65) Prior Publication Data

US 2006/0073375 A1  Apr. 6, 2006

(30) Foreign Application Priority Data

Sep. 7, 2004  (KR) .................. 10-2004-0071415

(51) Int. Cl.
*H01M 2/12* (2006.01)
(52) U.S. Cl. ............... 429/53; 429/54; 429/57; 429/62
(58) Field of Classification Search ............ 429/53, 429/54, 57, 58, 61, 62, 163, 185
See application file for complete search history.

(56) References Cited

U.S. PATENT DOCUMENTS

| | | | | |
|---|---|---|---|---|
| 6,080,505 A | * | 6/2000 | Pate | 429/53 |
| 6,579,640 B1 | * | 6/2003 | Nagase et al. | 429/54 |
| 2004/0038126 A1 | | 2/2004 | Gu | |
| 2006/0024574 A1 | * | 2/2006 | Yim et al. | 429/174 |

FOREIGN PATENT DOCUMENTS

| | | |
|---|---|---|
| CN | 1487613 A | 4/2004 |
| JP | 10074500 A * | 3/1998 |
| JP | 2000-067840 | 3/2000 |
| KR | 1999-002560 | 1/1999 |
| KR | 2000-0021323 | 4/2000 |

OTHER PUBLICATIONS

Korean Patent Abstract, Publication No. 1020000021323 A, published Apr. 25, 2000, in the name of Dae Jun Kim, et al.
Chinese Office action dated Dec. 1, 2006, for CN 200510102414.6.
English translation of Chinese Office action dated Dec. 1, 2006.

* cited by examiner

*Primary Examiner* — Tracy Dove
(74) *Attorney, Agent, or Firm* — Christie, Parker & Hale, LLP

(57) ABSTRACT

A lithium ion secondary battery has a shape memory safety vent adapted to discharge internal compressed gas by temporarily being opened when the temperature reaches a predetermined level to avoid a swelling phenomenon of the battery and improve safety. The lithium ion secondary battery includes an electrode assembly having first and second electrode plates wound a number of times with a separator interposed between them; a can having an opening formed on a side thereof to contain the electrode assembly; and a cap plate adapted to cover the can and provided with a vent hole on a side thereof, to which a safety vent adapted to deform at a predetermined temperature and discharge gas from inside the can to the exterior is coupled.

18 Claims, 4 Drawing Sheets

LITHIUM ION SECONDARY BATTERY HAVING SHAPE MEMORY SAFETY VENT

CROSS REFERENCE TO RELATED APPLICATION

This application claims priority to and the benefit of Korean Patent Application No. 10-2004-0071415 filed on Sep. 7, 2004 at the Korean Intellectual Property Office, the entire content of which is incorporated herein by reference.

BACKGROUND OF THE INVENTION

1. Field of the Invention

The present invention relates to a lithium ion secondary battery, and, more particularly, to a lithium ion secondary battery having a shape memory safety vent adapted to discharge internal compressed gas.

2. Description of Related Art

A typical lithium ion secondary battery includes: an electrode assembly formed by winding a positive electrode plate having a positive electrode active material attached thereto, a negative electrode plate having a negative electrode active material attached thereto, and a separator positioned between the positive and negative electrode plates to avoid a short circuit and allow only lithium ions to move, into a commonly known "jelly roll" structure; an electrolyte for enabling lithium ions to move; a can for containing and sealing the electrode assembly and the electrolyte; and a cap assembly for covering the can and preventing the electrode assembly from escaping.

Such a lithium ion secondary battery is manufactured as follows. A positive electrode plate having a positive electrode active material attached thereto, a negative electrode plate having a negative electrode active material attached thereto, and a separator are laminated and wound into a jelly roll. They are placed into a square-type can and a cap assembly is welded to the top thereof to seal it; an electrolyte is injected. Charging and inspection are performed to complete a bare cell. Various protective devices are attached to the bare cell. Assembly and inspection are then preformed to complete a conventional battery pack.

The lithium ion secondary battery is charged in a static voltage/static current condition and no overcharging occurs as long as the charging voltage is correctly controlled by the charger. When the charger is damaged or erroneously operated, however, abnormal charging occurs and the voltage and temperature of the battery abruptly increase. Such an increase decomposes the positive electrode active material or the electrolyte inside the battery. As a result, gas is generated and the battery swells. Such gas generation and swelling phenomenon may also result from heat supplied from outside the battery. The generated gas increases the internal pressure of the battery and causes the electrolyte to leak out. The battery may then explode or catch fire.

Safety measures to prevent such problems include a positive temperature coefficient (PTC) thermistor and a separator incorporating a shutdown function, as well as a safety vent actuated by gas generation as mentioned above.

Particularly, the safety vent of a conventional square-type lithium ion secondary battery refers to a thinner region formed on the bottom surface of the can or on the cap assembly. The safety vent fractures when the internal pressure of the can reaches a reference level and discharges gas to the exterior. Once actuated, the safety vent cannot return to the original state (i.e., it is irreversible) and must be disposed of.

As mentioned above, conventional safety vents are actuated only when the pressure reaches a reference level, regardless of the temperature of the battery, in an irreversible manner. During overcharging, however, voltage rise is generally preceded by temperature rise (or the battery temperature rises due to heat supplied from the exterior), which is then followed by gas generation. Although actuation in response to temperature is ideal, conventional safety vents respond only to pressure. This is an obstacle to improving the safety of the battery.

A large deviation exists in the battery pressure which fractures a safety vent formed as a thinner region. In other words, a safety vent may be unnecessarily actuated below a reference temperature or pressure or may fail to be actuated even above a reference temperature or pressure. This may result in explosion or fire since the safety vent is not designed to be actuated in proportion to temperature, but is designed to be physically actuated within a predetermined pressure range.

SUMMARY OF THE INVENTION

In accordance with the present invention a lithium ion secondary battery is provided having a shape memory safety vent adapted to discharge internal compressed gas by temporarily being opened when the temperature reaches a predetermined level to avoid a swelling phenomenon of the battery and improve safety.

In one aspect of the present invention a lithium ion secondary battery includes an electrode assembly having first and second electrode plates wound a number of times with a separator interposed between them, a can to contain the electrode assembly and having an opening formed at an end thereof; and a cap plate adapted to cover the opening and be provided with a vent hole through the cap plate, the vent hole mounting a safety vent adapted to deform at a predetermined temperature and discharge gas from inside the can to the exterior.

The safety vent may be adapted to deform in a temperature range of 70-150° C. and opens the vent hole.

The safety vent may include a cylindrical body having the same diameter as that of the vent hole and a disk-shaped latching plate positioned on top of the cylindrical body and having a diameter larger than that of the cylindrical body.

The cap plate may have a retaining plate attached to the top surface thereof to cover the vent hole and the safety vent. The retaining plate may comprise an edge plate welded to the cap plate on both opposite sides of the safety vent and a center plate connected to the edge plate in a position corresponding to the safety vent.

The center plate may have a curved portion formed on the interior thereof while being curved from the central top thereof toward the edge plate on the outer periphery thereof with a predetermined curvature so that, when the safety vent contracts at a predetermined temperature, it is not released to the exterior and a space portion formed among the curved portion, the safety vent, and the cap plate so that gas can be easily discharged to the exterior.

The inventive lithium ion secondary battery has greatly improved safety because, when the internal temperature rises above a predetermined level due to overcharging or heat supplied from the exterior, the safety vent temporarily contracts and discharges internal gas. Instead of being fractured and actuated in a pressure range having a large deviation as in the prior art, the inventive safety vent temporarily contracts and functions at a predetermined temperature and is actuated. As such, the operating condition of the safety vent becomes more precise and the safety of the battery improves further.

When the battery temperature drops below the predetermined range, the safety vent regains the original size and suppresses the discharge of internal gas. The battery is then ready for use again. The internal pressure of the battery decreases or the interior is in a substantially vacuum state as the temperature drops to the normal range. This further improves the safety of the battery.

DETAILED DESCRIPTION

Figure 1:
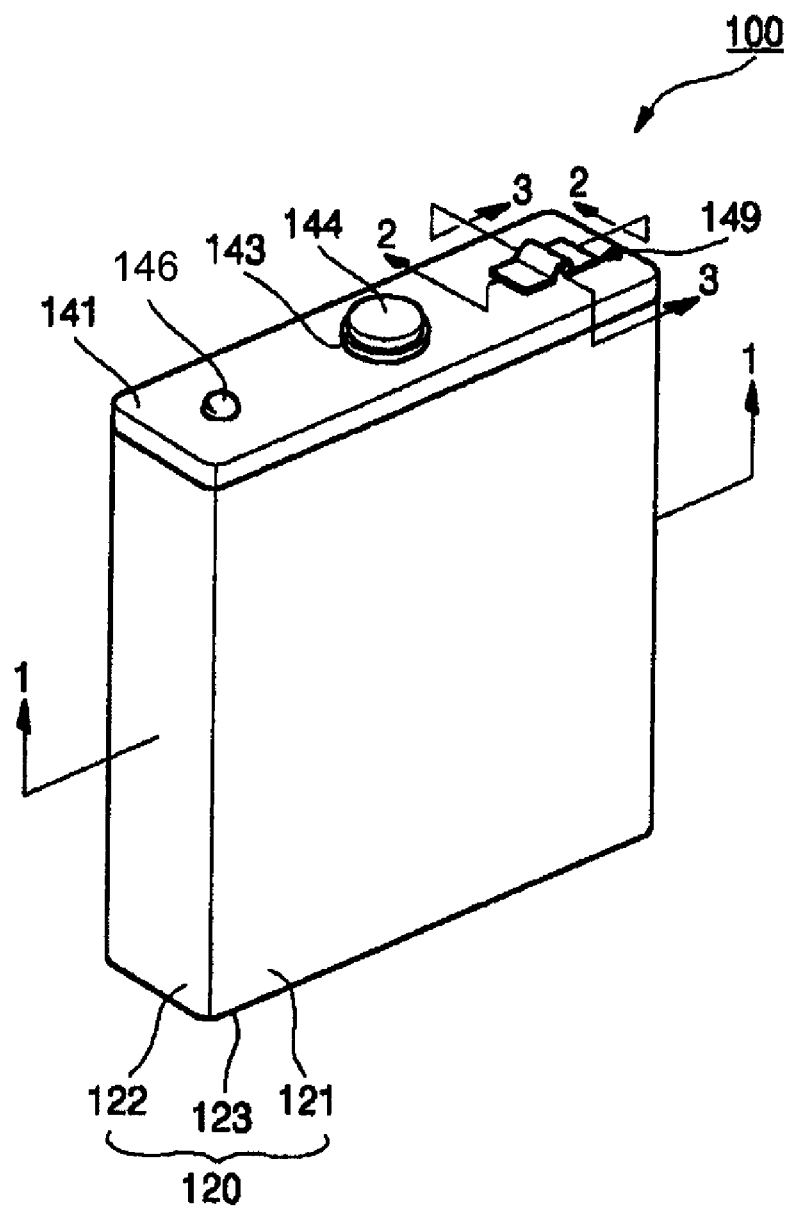
FIG. 1 is a perspective view showing a lithium ion secondary battery having a shape memory safety vent according to the present invention.

In the following description and drawings, the same reference numerals are used to designate the same or similar components, and so repetition of the description on the same or similar components will be omitted.

Figure 2:
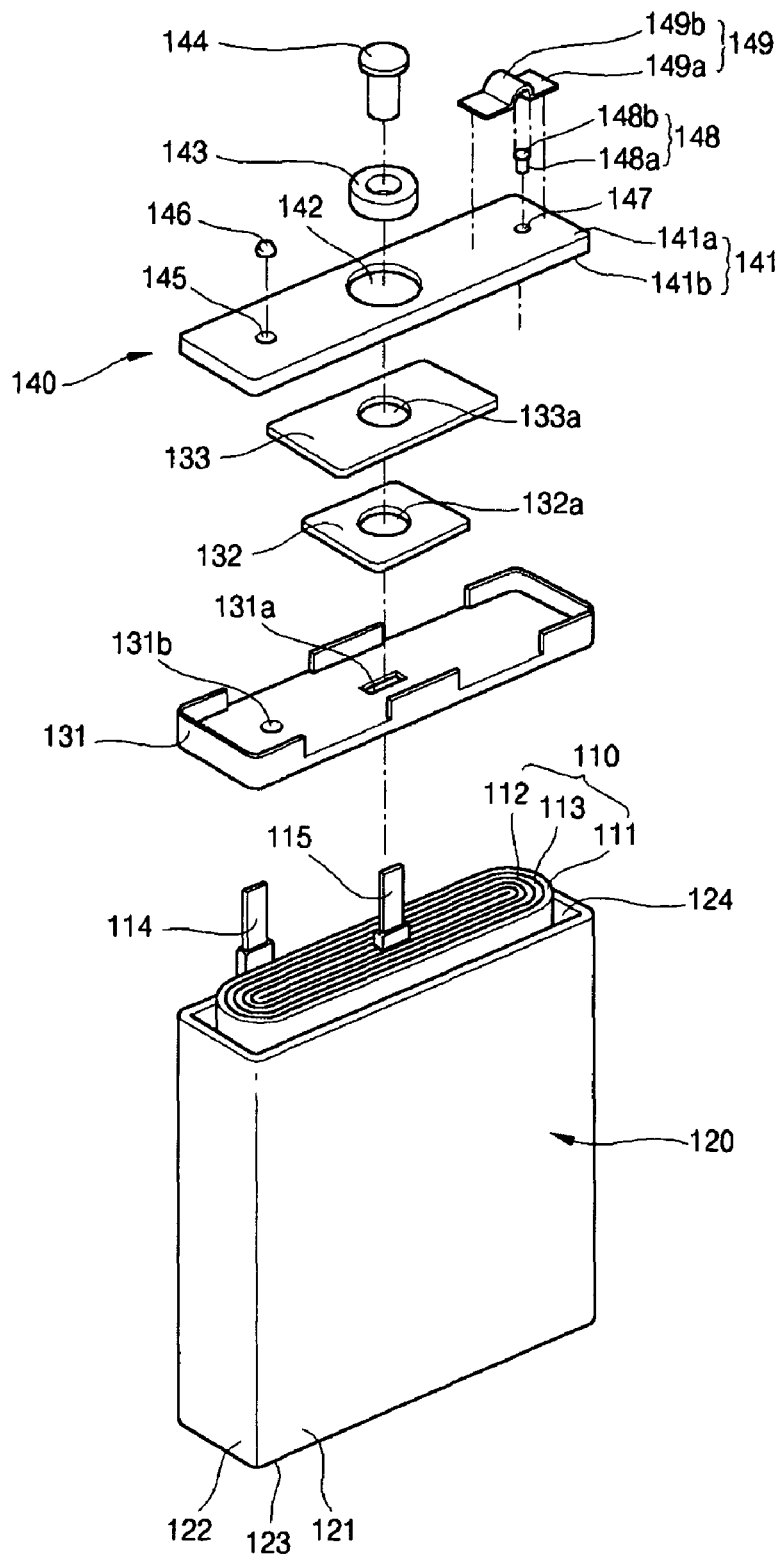
FIG. 2 is an exploded perspective view of the lithium ion secondary battery shown in FIG. 1.
Figure 3:
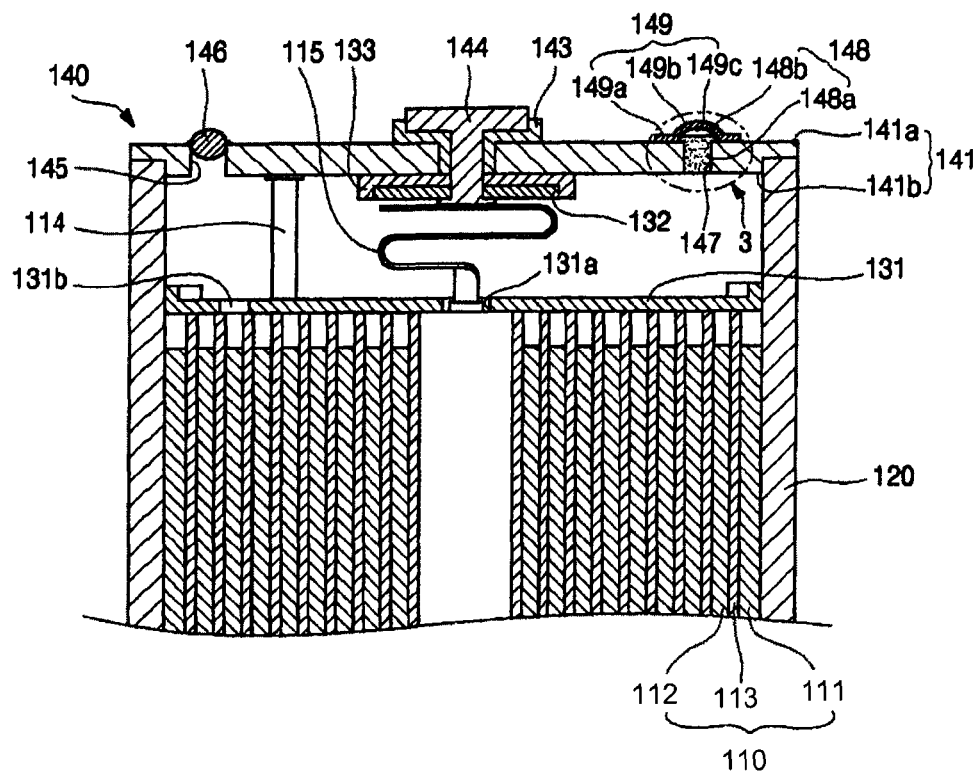
FIG. 3 is a sectional view taken along line 1-1 of FIG. 1.

Referring now to FIGS. 1, 2 and 3, a lithium ion secondary battery 100 includes an electrode assembly 110, a can (or a sheath) 120 for containing the electrode assembly 110, an electrolyte (not shown) injected into the can 120 to enable lithium ions to move, and a cap assembly 140 which covers the can 120 and prevents the electrode assembly 110 and the electrolyte from escaping to the exterior and which has a safety vent 148 adapted to deform at a predetermined temperature.

The electrode assembly 110 includes a first electrode plate 111 having a first active material (not shown) attached thereto, a second electrode plate 112 having a second active material (not shown) attached thereto, and a separator 113 positioned between the first and second electrode plates 111, 112 to avoid a short circuit and allow only lithium ions to move. The first and second electrode plates 111, 112 and the separator 113 are wound a number of times into a jelly roll and are contained in the can 120. The first and second electrode plates 111, 112 have first and second leads 114, 115 welded thereto, respectively, which protrude upward a predetermined distance.

The first active material may be a positive electrode active material (for example, lithium cobalt oxide ($LiCoO_2$)) and the first electrode plate 111 may be a positive electrode plate made up of aluminum (Al). The second active material may be a negative electrode active material (for example, graphite) and the second electrode plate 112 may be a negative electrode plate made up of copper (Cu). The first and second leads 114, 115 may be positive and negative electrode leads made up of aluminum and nickel, respectively. The separator 113 may be made up of polyethylene (PE) or polypropylene (PP), but the material is not limited in the present invention.

The can 120 includes at least one first surface 121, at least one second surface 122 connected to the first surface 121 and having an area smaller than that of the first surface 121, and a third surface 123 connected to both of the first and second surfaces 121 and 122. The can 120 has an opening 124 formed on the top thereof facing the third surface 123. Particularly, the can 120 has an approximately cuboid shape having an opening 124 formed on the top thereof. The can 120 may be made up of aluminum (Al), iron (Fe), an alloy, or an equivalent thereof, but the material is not limited herein.

The electrolyte (not shown) is injected into the can 120 and is positioned between the first and second electrode plates 111, 112 of the electrode assembly 110. The electrolyte acts as a medium for movement of lithium ions created by an electrochemical reaction near the first and second electrode plates 111, 112 inside the battery during charging/discharging and may be a non-aqueous organic electrolyte which is a mixture of a lithium salt and a high-purity organic solution. The electrolyte may also be a polymer using a high molecular electrolyte.

An insulation case 131, a terminal plate 132, and an insulation plate 133 may be successively coupled to the opening 124 of the can 120 on top of the electrode assembly 110, but these components are not always necessary in the present invention. The insulation case 131, the terminal plate 132, and the insulation plate 133 have through-holes 131a, 132a, and 133a formed thereon, respectively, so that the second d 115 extends through in the upward direction. The insulation case 131 has an electrolyte through-hole 131b formed thereon so that, when the electrolyte is injected through the cap plate 141 (described later), it can easily flow toward the electrode assembly 110.

The cap assembly 140 is welded to the opening 124 of the can 120 by a laser welding and includes a cap plate 141. The cap plate 141 has a through-hole 142 formed at the center thereof with a predetermined size, an electrolyte injection hole 145 formed on a side thereof for electrolyte injection, and a vent hole 147 formed on the other side thereof to be coupled to the safety vent 148. An insulation gasket 143 is coupled to the through-hole 142 of the cap plate 141 and an electrode terminal 144 is coupled to the insulation gasket 143. The electrode terminal 144 is welded to the second lead 115 to act as a negative or positive electrode during discharging or charging. The first lead 114 is welded between the electrolyte injection hole 145 of the cap plate 141 and the electrode terminal 144, so that the cap plate 141 and the can 120 act as a positive or negative electrode as a whole. A plug 146 is coupled and welded to the electrolyte injection hole 145 of the cap plate 141 so that, after the electrolyte is injected, it is prevented from leaking out.

The safety vent 148 having an approximately cylindrical shape is coupled to the vent hole 147 formed on the cap plate 141 and a retaining plate 149 is welded to the cap plate 141 to cover the vent hole 147 and the safety vent 148.

Figure 4:
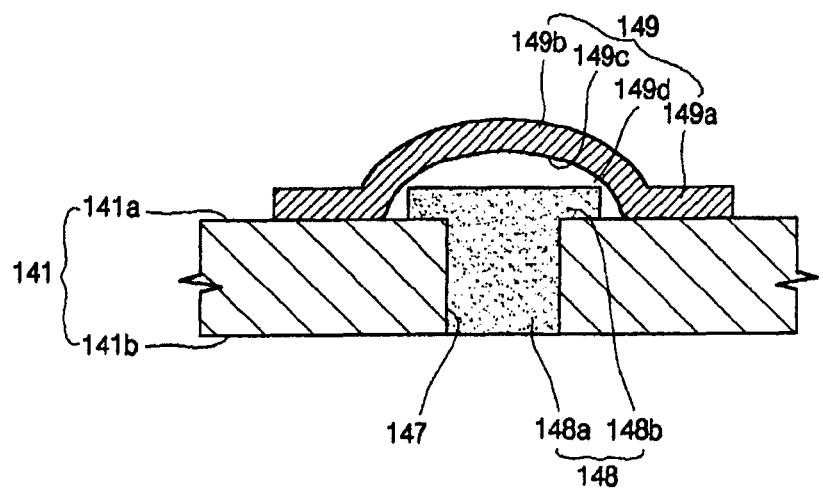
FIG. 4 is a sectional view taken along line 2-2 of FIG. 1 wherein the temperature is below a predetermined level and the shape memory safety vent has not yet been actuated.

Referring now to FIG. 4, a magnified view of region 3 of FIG. 3 is illustrated, wherein the cap plate 141 includes an approximately or completely planar first surface 141a, an approximately or completely planar second surface 141b opposing the first surface 141a, and a vent hole 147 formed between the first and second surfaces 141a and 141b with a predetermined diameter to be coupled to the safety vent 148. The safety vent 148 coupled to the vent hole 147 has a cylindrical body 148a having the same diameter as the vent hole 147 at a normal operating temperature and a disk-shaped latching plate 148b positioned on top of the cylindrical body 148a to contact the first surface 141a of the cap plate 141 and having a diameter larger than that of the cylindrical body 148a.

In an exemplary embodiment the safety vent 148 may be made up of such a material that, when the battery temperature rises above a predetermined level, it temporarily contracts and open the vent hole 147. For example, the safety vent 148 may be made up of such a material that is actuated at a temperature range of 70-150° C., in which gas is generally generated in the battery, and returns to the original shape when the temperature drops.

The safety vent 148 may be made up of a shape memory alloy which contracts in a predetermined temperature range and regains the original volume below the temperature range. The shape memory alloy may be any one chosen from Ni—Ti alloy, Cu—Zn—Al alloy, Cu—Al—Ni alloy, and an equivalent thereof, but the material is not limited thereto. The shape memory alloy may be any one chosen from Ni—Ti alloy, Cu—Zn—Al alloy, Cu—Al—Ni alloy, and an equivalent thereof and having a predetermined amount of Mn added thereto. The shape memory alloy may be any one chosen from Cu—Zn—Al alloy, Cu—Al—Ni alloy, and an equivalent thereof and having a predetermined amount of Ti added thereto.

When the safety vent 148 contracts in a predetermined temperature range and discharges internal gas, it may be completely released out of the cap plate 141 by the gas pressure. Therefore, a retaining plate 149 may be attached to the first surface 141a of the cap plate 141 outside the safety vent 148 to cover it. The retaining plate 149 may include an edge plate 149a welded to the cap plate 141 on both opposite sides of the safety vent 148 and a center plate 149b connected to the edge plate 149a in a position corresponding to the safety vent 148. The retaining plate 149 may further include a curved portion 149c curved from the central top of the center plate 149b toward the edge plate 149a on the outer periphery thereof with a predetermined curvature and a space portion 149d formed between the curved portion 149c and the first surface 141a of the cap plate 141 while being in communication with the exterior so that the gas inside the battery can be easily discharged to the exterior. The retaining plate 149 may be made up of aluminum, iron, an alloy, or an equivalent thereof, as in the case of the cap plate 141, but the material is not limited herein.

Figure 5A:
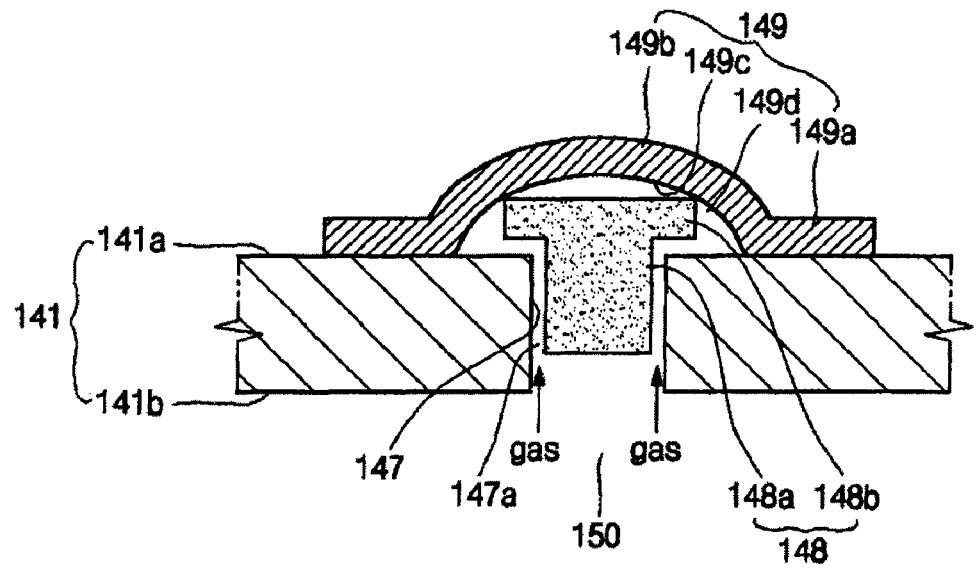
FIG. 5A is a sectional view taken along line 2-2 of FIG. 1 wherein the temperature is above a predetermined level and the shape memory safety vent has been actuated.
Figure 5B:
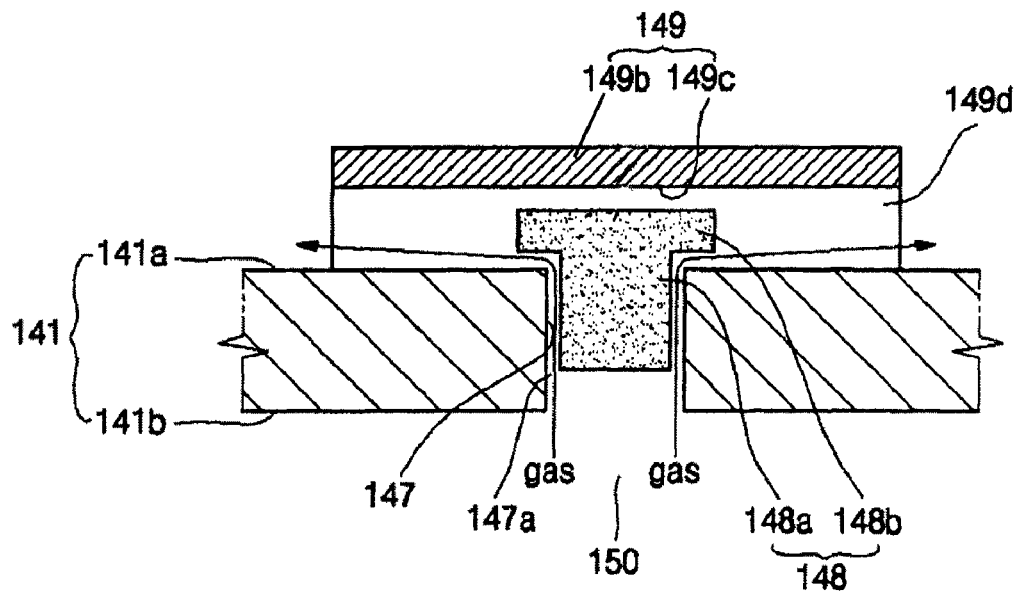
FIG. 5B is a sectional view taken along line 3-3 of FIG. 1.

Referring now to FIG. 5A, a sectional view taken along line 2-2 of FIG. 1 wherein the temperature is above a predetermined level and the shape memory safety vent has been actuated is illustrated. Also referring to FIG. 5B, a sectional view taken along line 3-3 of FIG. 1 wherein the temperature is above a predetermined level and the shape memory safety vent has been actuated is illustrated. The safety vent 148 contracts when the temperature inside the battery is approximately 70-150° C. (this temperature range give as only an example and can be modified) and opens the vent hole 147. Particularly, the diameter of the cylindrical body 148a of the safety vent 148 becomes smaller than that of the vent hole 147 and the gas pressure 150 pushes the cylindrical body 148a and the disk-shaped latching plate 148b in the outward direction, so that internal gas is discharged to the exterior through the space 147a between the safety vent 148 and the vent hole 147 and the space portion 149d between the center plate 149b of the retaining plate 149 and the cap plate 141. The center plate 149b of the retaining plate 149 limits the traveling distance of the latching plate 148b of the safety vent 148 such that the safety vent 148 is not completely released to the exterior by the gas pressure. When the battery temperature returns to the normal range during such gas discharge, the safety vent 148 regains the original volume or size and again blocks the vent hole 147. Specifically, the diameter of the cylindrical body 148a of the safety vent 148 becomes equal to that of the vent hole 147 and completely blocks the vent hole 147. The gas discharge is then interrupted and the battery is again ready for use. As such, the battery does not need to be discarded once the safety vent 148 is actuated as in the prior art.

As mentioned above, the inventive lithium ion secondary battery has greatly improved safety because, when the internal temperature rises above a predetermined level due to overcharging or heat supplied from the exterior, the safety vent temporarily contracts and discharges internal gas. Instead of being fractured and actuated in a pressure range having a large deviation as in the prior art, the inventive safety vent temporarily contracts and functions at a predetermined temperature and is actuated. As such, the operating condition of the safety vent becomes more precise and the safety of the battery improves further.

When the battery temperature drops below the predetermined range, the safety vent regains the original size and suppresses the discharge of internal gas. The battery is then ready for use again. The internal pressure of the battery decreases or the interior is in a substantially vacuum state as the temperature drops to the normal range. This further improves the safety of the battery.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A secondary battery comprising:
   an electrode assembly comprising a first electrode plate, a second electrode plate, and a separator between the first and second electrode plates;
   a can containing the electrode assembly and having an opening formed at an end of the can;
   a cap plate covering the opening and having a vent hole through the cap plate; and
   a safety vent in the vent hole and comprising a shape memory alloy, wherein the safety vent contracts and opens the vent hole for discharging gas from inside the can when a temperature inside the can rises above a predetermined temperature.

2. The secondary battery as claimed in claim 1, wherein the safety vent contracts and opens the vent hole when the temperature inside the can is approximately 70-150° C.

3. The secondary battery as claimed in claim 1, wherein the safety vent comprises an alloy selected from the group consisting of Ni—Ti alloys, Cu—Zn—Al alloys, and Cu—Al—Ni alloys.

4. The secondary battery as claimed in claim 1, wherein the safety vent comprises a Ni—Ti alloy having Mn added thereto.

5. The secondary battery as claimed in claim 1, wherein the safety vent comprises an alloy selected from the group consisting of Cu—Zn—Al alloys and Cu—Al—Ni alloys and having Ti added thereto.

6. The secondary battery as claimed in claim 1, wherein the safety vent comprises an alloy selected from the group consisting of Cu—Zn—Al alloys and Cu—Al—Ni alloys and having Mn added thereto.

7. The secondary battery as claimed in claim 1, wherein the safety vent comprises a cylindrical body having a diameter that is the same as a diameter of the vent hole for sealing the vent hole when the secondary battery is at a normal operating temperature.

8. The secondary battery as claimed in claim 7, wherein the diameter of the cylindrical body becomes smaller than the diameter of the vent hole at the predetermined temperature, the predetermined temperature being greater than the normal operating temperature.

9. The secondary battery as claimed in claim 7, wherein the safety vent further comprises a disk-shaped latching plate on the cylindrical body and having a diameter larger than the diameter of the cylindrical body.

10. The secondary battery as claimed in claim 1, further comprising a retaining plate attached to an outer surface of the cap plate and at least partially covering the vent hole and the safety vent.

11. The secondary battery as claimed in claim 10, wherein the retaining plate comprises an edge plate welded to the cap plate on at least one side of the safety vent and a center plate connected to the edge plate in a position corresponding to the safety vent.

12. The secondary battery as claimed in claim 11, wherein the center plate has a curved portion on an interior portion thereof and being curved from a central portion thereof toward the edge plate at an outer periphery thereof with a curvature such that, when the safety vent contracts at the predetermined temperature, the safety vent is retained in the vent hole by the curved portion and the gas is dischargeable through the vent hole from inside the can.

13. The secondary battery as claimed in claim 1, wherein the electrode assembly has first and second leads connected to the first and second electrode plates, respectively, and the first lead is connected to the cap plate.

14. The secondary battery as claimed in claim 13, further comprising an electrode terminal coupled to the cap plate and a gasket interposed between the electrode terminal and the cap plate, wherein the second lead is connected to the electrode terminal.

15. A secondary battery comprising:
a chargeable/dischargeable electrode assembly;
a sheath containing the electrode assembly;
a cap plate attached to the sheath for retaining the electrode assembly in the sheath and having a vent hole therein; and
a safety vent in the vent hole and comprising a shape memory alloy, wherein the safety vent contracts and opens the vent hole for discharging gas from inside the sheath when a temperature of at least one of the electrode assembly and the sheath rises above a predetermined temperature.

16. A method of discharging compressed gas in a secondary battery, the method comprising:
mounting a cap plate over an opening in a can housing an electrolyte and an electrode assembly, the cap plate having a vent hole through the cap plate; and
mounting a safety vent comprising a shape memory alloy within the vent hole, wherein the safety vent contracts and opens the vent hole when a temperature within the can rises above a predetermined temperature such that the gas is discharged through the vent hole from within the can.

17. The method of claim 16, further comprising mounting a retaining plate on the cap plate for retaining the safety vent within the vent hole during gas discharge.

18. The method of claim 16, wherein the safety vent seals the vent hole when the temperature within the can is at a normal operating temperature less than or equal to the predetermined temperature and contracts and opens the vent hole for discharging the gas from inside the can when the temperature within the can is approximately 70-150° C.

* * * * *